Aug. 16, 1932.  D. P. MOLONY  1,871,818
INTAKE MANIFOLD FOR MULTIPLE CYLINDER INTERNAL COMBUSTION ENGINES
Filed June 24, 1924  3 Sheets-Sheet 3

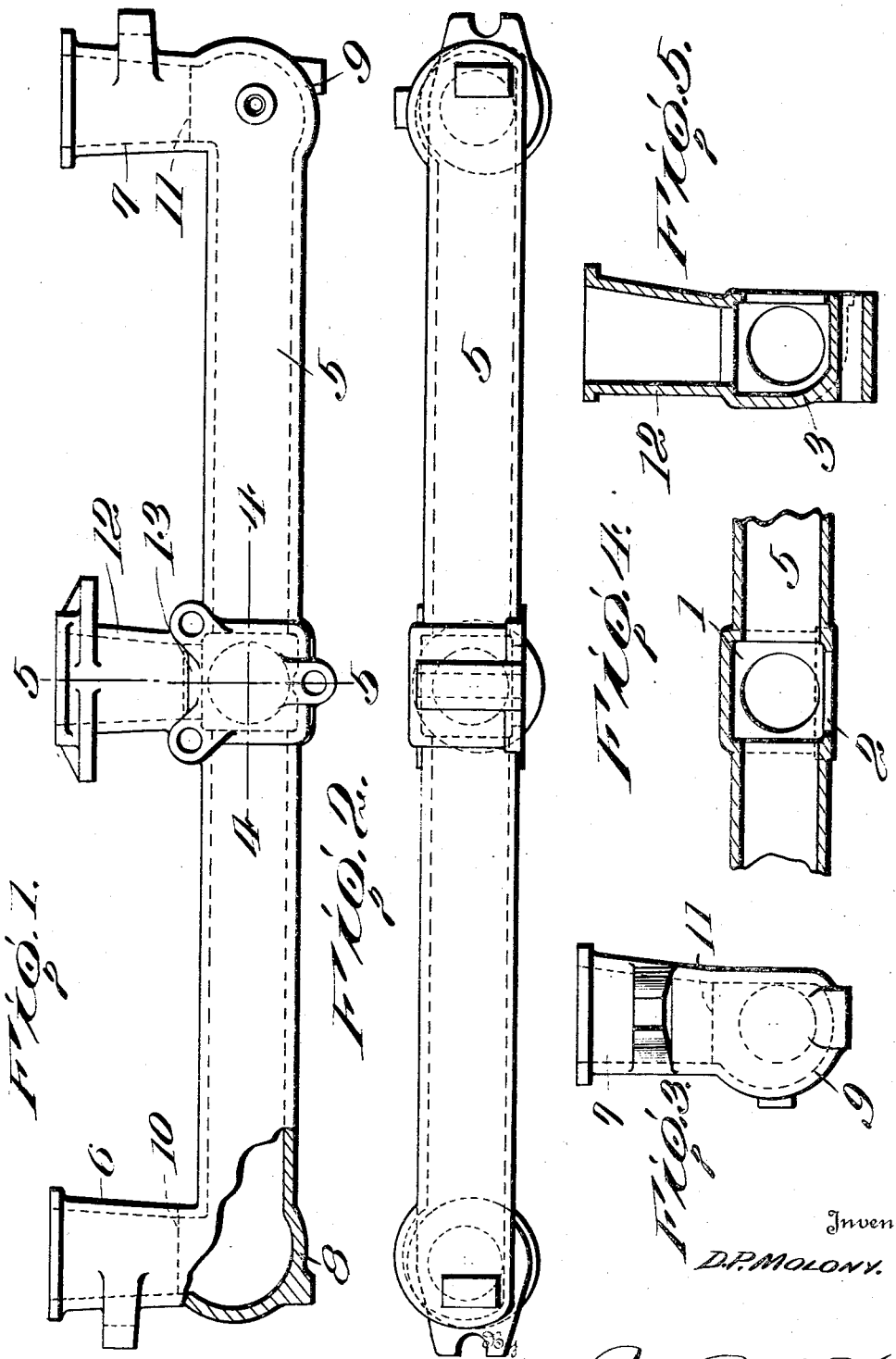

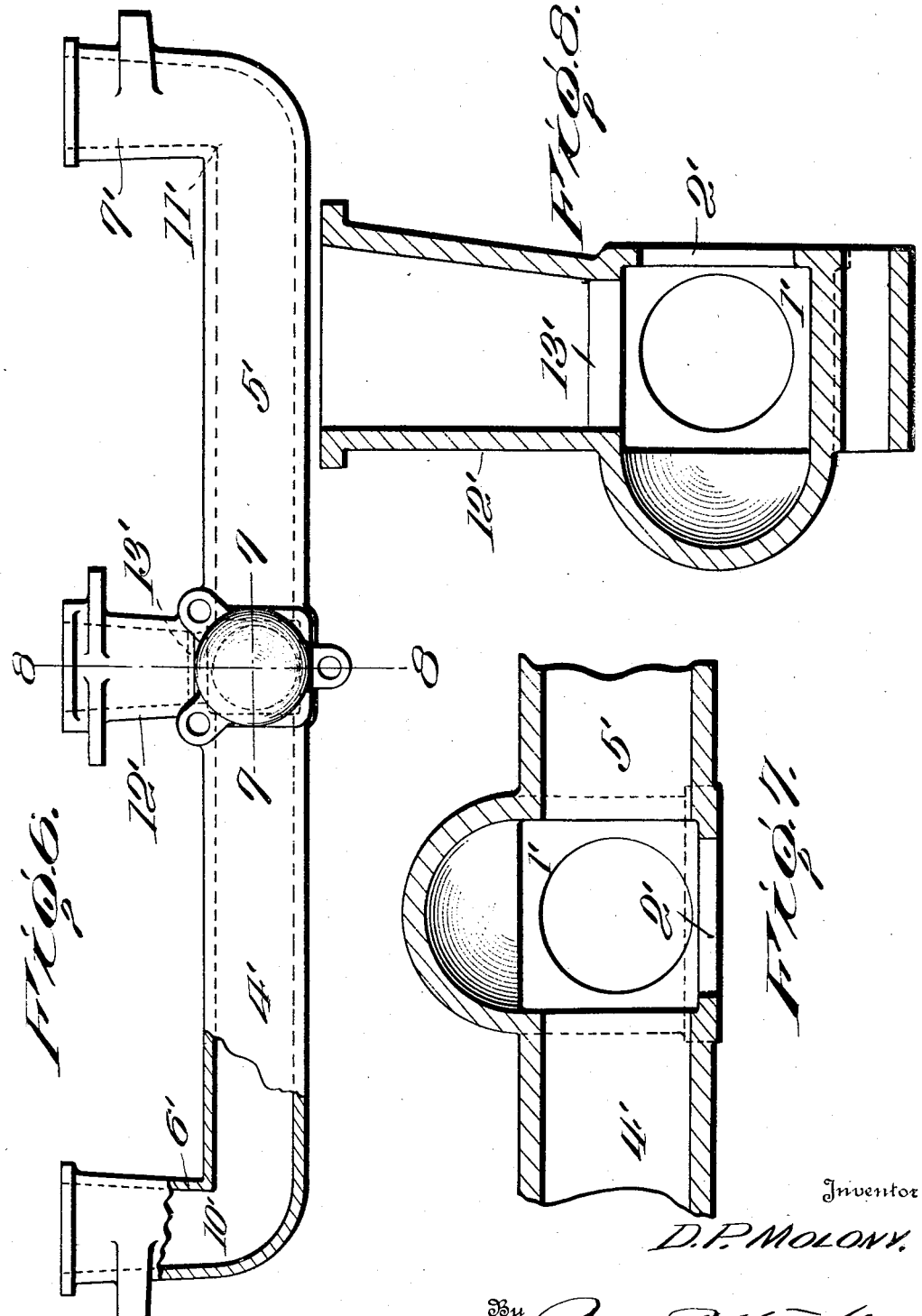

Inventor
D. P. MOLONY.
By
Attorney

Patented Aug. 16, 1932

1,871,818

UNITED STATES PATENT OFFICE

DONALD P. MOLONY, OF FLINT, MICHIGAN, ASSIGNOR TO MARVEL CARBURETER COMPANY, OF FLINT, MICHIGAN, A CORPORATION OF INDIANA

INTAKE MANIFOLD FOR MULTIPLE CYLINDER INTERNAL COMBUSTION ENGINES

Application filed June 24, 1924. Serial No. 722,152.

This invention relates to certain new and useful improvements in intake manifolds for multiple cylinder internal combustion engines, the object being to provide a manifold in which the main conduit and branches are arranged in the same horizontal plane in order to eliminate pockets in which the unvaporized fuel can collect, whereby the mechanical mixture delivered to the manifold will be drawn into the respective cylinders of the engine in a vaporized conditon.

Another and further object of the invention is to provide a manifold having end branches formed with bulbs to eliminate the formation of pockets in the bends of the branches.

Another and further object of the invention is to provide a manifold which varies alternately in cross sectional area in order to cause an alternate expansion and contraction of the column of fuel mixture in its passage to the internal combustion engine.

A still further object of the invention is to provide an intake manifold having a central chamber, of an area greater than the area of the manifold into which the charge is delivered from the charge forming device and in which the charge expands, the chamber being formed with outlets having sharp corners so as to break up the unvaporized fuel or raw gas before it is delivered into the main and branch conduits.

Other and further objects and advantages of the invention will be hereinafter set forth and the novel features thereof defined by the appended claims.

In the drawings,

Figure 1 is a top plan view of an intake manifold constructed in accordance with my invention;

Figure 2 is a side elevation of a manifold;

Figure 3 is an end elevation of the manifold;

Figure 4 is a section taken on line 4—4 of Figure 1;

Figure 5 is a section taken on line 5—5 of Figure 1;

Figure 6 is a plan view of a slightly modified form of manifold, partly in section;

Figure 7 is a section taken on line 7—7 of Figure 6;

Figure 8 is a section taken on line 8—8 of Figure 6;

Figure 9:
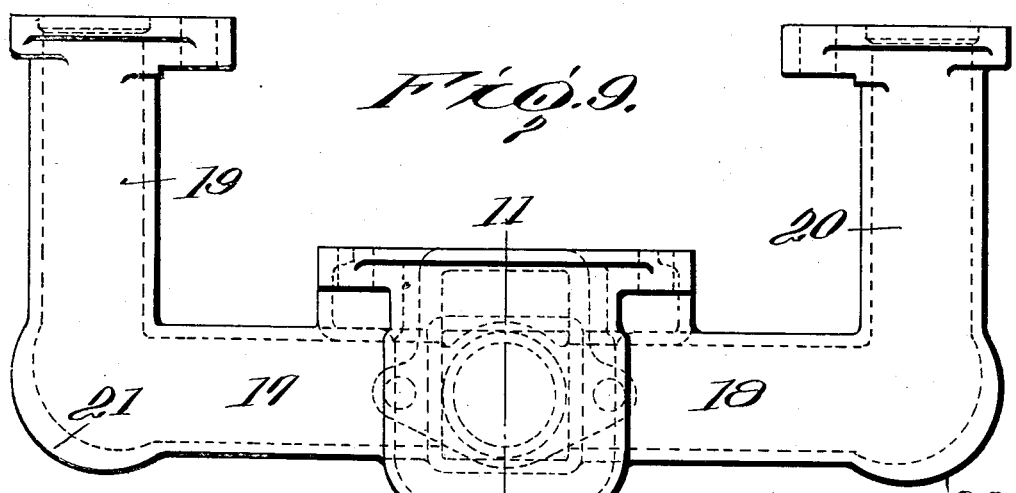
Figure 9 is a plan view of still another embodiment of my invention showing the application of a heat chamber with a central expansion chamber.

In the embodiment of my invention as shown in Figures 1 to 5, 1 indicates a central expansion chamber which is provided with an inlet 2 of less diameter than the chamber and to which the charge forming device is adapted to be connected, said inlet being arranged in the bottom of the chamber so that the chamber is formed directly over the riser and as herein shown is provided with a rounded dome 3 as shown in Figure 5.

Extending from the opposite sides of the chamber 1 are the arms 4 and 5 of the main conduit which is circular in cross section and is provided with branches 6 and 7 at its ends adapted to be connected to the intake ports of the internal combustion engine.

The ends of the main conduit at the junction with the branches are provided with bulbs 8 and 9 so that the bottom of the main conduit at the junction with the branches is formed perfectly flat to avoid the formation of pockets and these bulbs form chambers where the column of fuel mixture expands.

The branches 6 and 7 are formed with tapering bores as clearly shown which taper from their ends towards the junction with the arms 4 and 5 in order to produce restricted portions 10 and 11, through which the column of fuel passes so as to increase the velocity of the fuel mixture after it has been expanded in the chambers formed by the bulbs whereby the fuel mixture is first expanded as it enters the mixing chamber and then contracted as it passes through the arms and then expanded and again contracted and again expanded so as to obtain a thorough comingling of the mixture in its passage to the internal combustion engine.

Extending from the central expansion chamber 1 in the direction of the branches 6 and 7 is a central branch 12 which is provided with a tapering bore as shown which forms a restriction 13 so as to increase the velocity of the fuel mixture and to contract the same so that after it passes into the branch its is again expanded.

In the embodiment of my invention as shown in Figures 6, 7 and 8, 1' indicates the central expansion chamber having the oppositely disposed conduits 4' and 5' and provided with an inlet 2' and a spherical dome 3'. The arms 4' and 5' are provided with branches 6' and 7' having tapering bores but the bulbs as shown in the embodiment of my invention in Figures 1 to 5 are eliminated and the bends struck on the arc of a circle so that the cross section area of the arms 4' and 5' at the junction of the branches 6' and 7' are the same.

The tapering bores of the branches 6' and 7' form restrictions 10' and 11' to increase the velocity of the volume of fuel as it passes into the branches.

The central expansion chamber is provided with a central branch 12' having a restriction 13' to increase the velocity of fuel mixture in its passage therethrough.

In the embodiment of the invention as shown in Figures 6, 7 and 8, the construction of the manifold in general is substantially the same as shown in Figures 1 to 5 with the exception that the central expansion chamber is provided with a spherical dome and the bulbs or enlargements at the junction of the end branches are eliminated.

Figure 10:
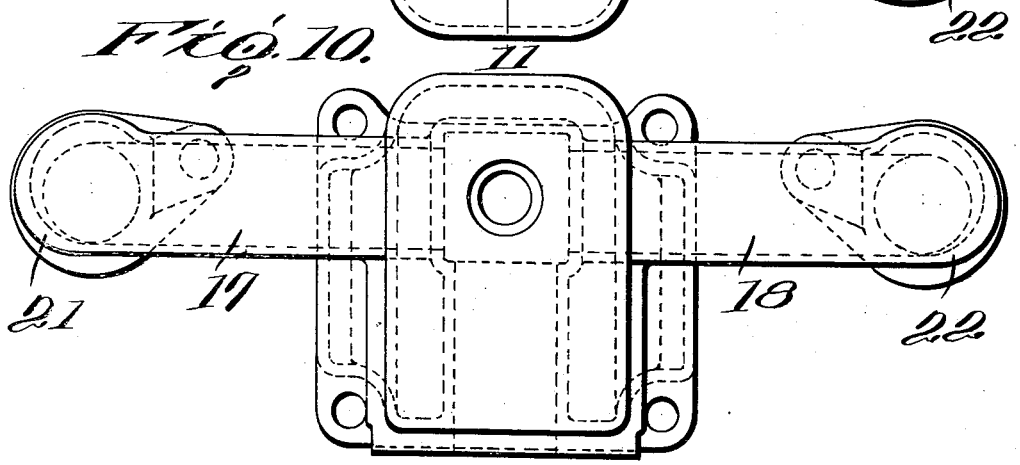
Figure 10 is a side elevation of the form shown in Figure 9.
Figure 11:
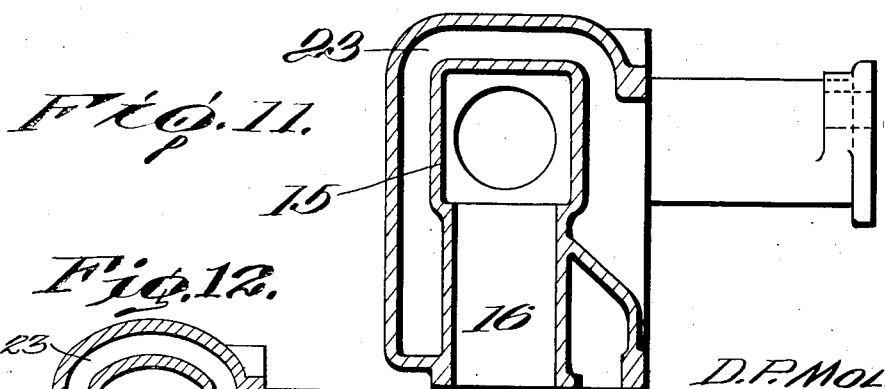
Figure 11 is a section taken on line 11—11 of Figure 9.
Figure 12:
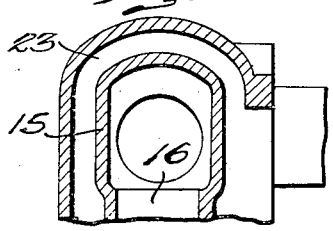

In the embodiment of my invention as shown in Figures 9 to 11 I illustrate a manifold for a two port or four cylinder internal combustion engine having means for heating the expansion chamber in order to aid the vaporization of the fuel in its passage to the internal combustion engine.

Referring to Figure 9, 15 indicates a central expansion chamber from the bottom of which extends a vertical riser 16, said chamber having extending therefrom the arms 17 and 18 of the main conduit from the ends of which extend branches 19 and 20, the cross section area of the branches 19 and 20 being the same as the cross section area of the arms 17 and 18. The bends at the junction of the branches with the arms 17 and 18 are provided with bulbs 21 and 22 constructed in substantially the same manner as shown in Figures 1 to 5, said bulbs eliminating the formation of pockets at the bends.

The expansion chamber 15 and riser 16 are surrounded by a heating chamber 23 through which the exhaust gases of the internal combustion engine are adapted to pass, the application of heat being controlled by a damper arranged in the main exhaust line in the same manner as the installation now in general use on Buick automobiles.

In the various embodiments of my invention as herein described, the main conduit and arms are arranged in the same horizontal plane so as to eliminate the formation of pockets in which unvaporized or raw gas can collect and while I have shown a construction of manifold for a six-cylinder automobile and a four-cylinder automobile, it is, of course, understood that the construction of manifold as herein described could be adapted for use in connection with internal combustion engines having any number of cylinders by increasing or decreasing the number of branches and therefore I do not wish to limit myself to the construction of manifold with any particular number of branches nor to the construction of the formation of the branches at the junction with the main conduit, as in some instances it might be beneficial to eliminate the bulbs and as I have shown manifolds constructed without the bulbs and with the bulbs and a central expansion chamber with a flat spherical or round dome, I reserve the right to change the construction of manifold so as to incorporate therein the various features disclosed without departing from my invention.

From the foregoing description it will be seen that I have provided a manifold which is provided with a central expansion chamber from which extend arms and branches arranged in the same horizontal plane and so constructed that the formation of pockets are eliminated and a manifold produced in which the column of explosive fuel passing therethrough is alternately expanded and contracted so as to break up the unvaporized particles of fuel and to form a very efficient explosive mixture which will be evenly distributed to the various cylinders of the internal combustion engine to which the manifold is attached.

What I claim is:—

1. A manifold having a central chamber adapted to receive liquid fuel and air from a carbureter, and passages leading from said chamber at opposite ends thereof and constituting means for conducting liquid fuel and air from the chamber to a plurality of cylinders of an internal combustion engine, opposite walls of said chamber having shoulders for deflecting liquid fuel from said walls inwardly toward the longitudinal median line of the chamber so that such deflected fuel will be picked up by and commingled with air as it leaves the chamber and enters the respective passages, the intermediate portions of said walls between said shoulders being offset outwardly and forming an enlargement into which the liquid fuel and air from the carbureter is adapted to flow under their own inertia after the suction effect from any of the engine cylinders has ceased and in which the liquid fuel and air are adapted to expand and cause the velocity thereof to be lowered.

2. A manifold having a chamber through the center of which a stream of air is adapted to flow and over the walls of which liquid fuel is adapted to flow, and a passage leading from said chamber and constituting means for conducting a mixture of liquid fuel and air from said chamber to a plurality of cylinders of an internal combustion engine, one wall of said chamber being provided at a predetermined point with respect to said passage with means for deflecting liquid fuel passing over said wall into the air stream as it enters said passage.

3. A manifold having a chamber through the center of which a stream of air is adapted to flow and over the walls of which liquid fuel is adapted to flow, and a passage leading from said chamber and constituting means for conducting a mixture of liquid fuel and air from said chamber to a plurality of cylinders of an internal combustion engine, one wall of said chamber being provided at a predetermined point with respect to said passage with an outwardly offset shoulder for deflecting liquid fuel passing over said wall into the air stream as it enters said passage, the cross sectional area of said chamber being greater than the cross sectional area of the passage aforesaid.

4. A manifold having a chamber provided at the center of a wall thereof with an opening for receiving liquid fuel and air from a carburetor, and passages leading from said chamber at an end thereof for receiving liquid fuel and air from said chamber and conducting the same to a plurality of cylinders of an internal combustion engine, and means within the chamber at predetermined points with respect to said passages for deflecting liquid fuel from the walls of the chamber inwardly toward the longitudinal median line of the chamber so that such deflected fuel will be picked up and commingled with air at the points of entering the respective passages.

5. A manifold having a central chamber having means at the center of a wall thereof for receiving liquid fuel and air from a carbureter, means for receiving liquid fuel and air from said chamber and conducting the same to a plurality of cylinders of an internal combustion engine including passages leading from said chamber at opposite ends thereof, two walls of said chamber having portions thereof offset outwardly with the ends of said offset portions located at predetermined points with respect to said passages and constituting shoulders for deflecting liquid fuel from said walls inwardly toward the longitudinal median line of the chamber so that such deflected fuel will be picked up by and commingled with air as it leaves the chamber and enters the respective passages, the cross sectional area of said chamber at any of said shoulders being greater than the cross sectional area of any of the respective passages.

In testimony whereof I hereunto affix my signature.

DONALD P. MOLONY.